W. T. CLAWSON & W. T. DENNIS.
Milk-Carriers.
No. 148,548. Patented March 17, 1874.
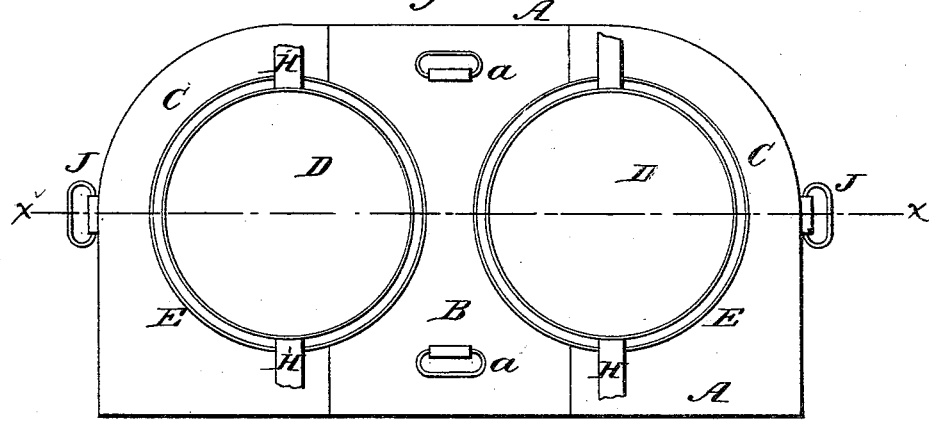
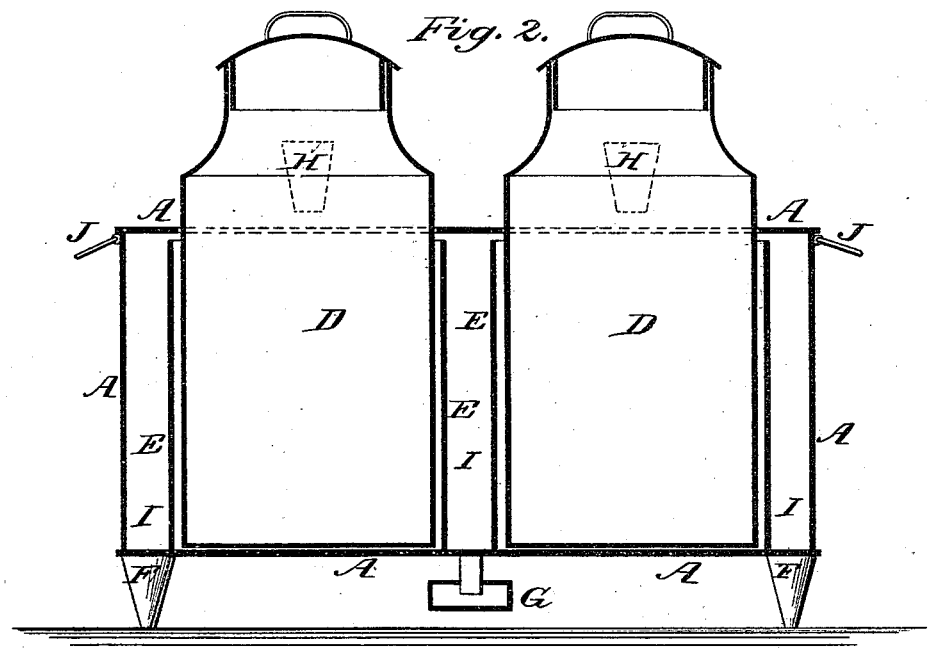

UNITED STATES PATENT OFFICE.

WILLIAM T. CLAWSON AND WILLIAM T. DENNIS, OF RICHMOND, INDIANA.

IMPROVEMENT IN MILK-CARRIERS.

Specification forming part of Letters Patent No. 148,548, dated March 17, 1874; application filed June 30, 1873.

*To all whom it may concern:*

Be it known that we, WILLIAM T. CLAWSON and WILLIAM T. DENNIS, of Richmond, Wayne county, Indiana, have invented certain new and useful Improvements in Carrying, Preserving, and Delivering Milk; and we do hereby declare the following to be a full, clear, and exact description of the same, reference being had to the drawings which accompany this specification, and forming a part thereof, and to the letters of reference thereon, in which—

Figure 1 is a top view of our improved apparatus. Fig. 2 is a vertical sectional view taken at the line $x\ x$.

Like letters of reference refer to like parts.

In Fig. 1, A A A represent the outer casing of a reservoir or receptacle, which may be constructed in any desired form and of any suitable material, and provided with openings E E for the reception of cans D D. The top of the reservoir A A A is provided with a removable cover, B, having handles $a\ a$, and occupying the central portion of said top. The other portions of the top of the reservoir, marked C C, may be rigidly attached to the sides A A A, or the whole top made removable. H H represent the handles of the milk-can, and J J the handles of the reservoir.

In Fig. 2 is a vertical sectional view of our improved apparatus, taken at the line $x\ x$ in Fig. 1. The spaces I I I represent the openings between the walls or sides of the reservoir and the openings E E, which, in hot weather, are intended to be filled with ice for the purpose of controlling the temperature of the milk, said tubes E E preventing the ice from coming in contact with the outer surface of the cans D D, which contain the milk, and securing them from damage from bruises or abrasions. The legs F F serve as a support to the reservoir, as above described, and serve to furnish space for a lamp or lamps, G, the flames of which, in any suitable manner, are intended to operate upon the outer surface of the bottom of said reservoir or receptacle, and in extremely cold weather to also furnish sufficient heat to any substance or matter with which the spaces I I I may be filled, to prevent the milk from being frozen or improperly cooled.

The lamp or lamps G may be rigidly attached to the reservoir, or may be detached, as most convenient.

It will be seen that the object of our invention is to secure in the same apparatus, in a cheap, durable, and convenient form, the means of keeping milk sweet and cool in the heat of summer, and sufficiently warm in the extreme cold of winter to insure to the consumer an approximately-uniform temperature, and in adapting this device to the capacity of the smallest or the largest of vehicles used in the transportation and delivery of milk.

Another advantage accruing is found in the facility afforded the milkman to keep his feet warm from the heat of the lamp in the rigors of winter.

That portion of the reservoir composed of the spaces I I I is furnished with a suitable opening, by which the contents may be drawn off, as desired.

While the cans D D may be taken out of their openings and returned at pleasure, it will be seen that the reservoir may be readily put into or taken from the wagon or vehicle which is intended for its transportation, either with or without the cans, as may be desired.

The bottoms of the openings E E may be furnished with cushions, of any suitable elastic substance, to prevent the jarring incident to the motion of the wagon or other vehicle used.

Having thus fully described our said improvement, what we claim as our invention, and desire to secure by Letters Patent, is—

A milk-can carrier consisting of a vessel having secured within it vertical hollow cylinders, open at the top for the reception of the cans, surrounding space for the retention of cooling and warming agents, and a lamp beneath for heating, substantially as shown and described.

WILLIAM T. CLAWSON.
WM. T. DENNIS.

Witnesses:
JOHN BELL,
JAMES M. FARLOW.